United States Patent [19]
Stosberg et al.

[11] 3,890,668
[45] June 24, 1975

[54] LOCKABLE CASTOR, IN PARTICULAR SWIVEL CASTOR

[75] Inventors: Herbert Stosberg; Horst Fleishmann; Günter Reinhards; Siegfried Engels, all of Wermelskirchen-Tente/Rhineland, Germany

[73] Assignee: Tente-Rollen G.m.b.H., Wermelskirchen-Tente, Germany

[22] Filed: Dec. 22, 1971

[21] Appl. No.: 210,759

[30] Foreign Application Priority Data
Jan. 20, 1971  Germany.............................. 2102509

[52] U.S. Cl.......................................... 16/35; 188/1
[51] Int. Cl............................................. B60b 33/00
[58] Field of Search............... 16/35 R, 35; 188/1 D; 292/144

[56] References Cited
UNITED STATES PATENTS

| | | | |
|---|---|---|---|
| 2,205,712 | 6/1940 | Bitgood.................................. | 16/35 |
| 2,786,701 | 3/1957 | Poulich............................... | 292/144 |
| 3,571,842 | 3/1971 | Fricke.................................. | 16/35 R |
| 3,705,438 | 12/1972 | Stosberg et al......................... | 16/35 |

Primary Examiner—Paul R. Gilliam
Assistant Examiner—Doris L. Troutman
Attorney, Agent, or Firm—Burgess, Dinklage & Sprung

[57] ABSTRACT

A castor, particularly in the form of a swivel castor, is provided with a locking mechanism for locking the running wheel against running and/or swivelling movement. Catch members of the locking mechanism are accommodated in the hollow of the castor fork. The locking mechanism comprises an electromagnet with a movable magnetic core, which is force-lockingly connected to the movable catch members of the locking mechanism and can act on these against the pressure of a spring. The electromagnet may be accommodated in the castor fixing pin. In an alternative the electromagnet may be applied on the castor fixing pin in extension of this and forming one unit with it. An axially-movable actuating pin passing through the castor fixing pin and acts on the movable catch members accommodated in the fork hollow. In the castor fixing pin may be provided between the actuating pin and the magnet a locking member which can be indexed to the next position stepwise by said magnet, and which locks the actuating pin.

11 Claims, 3 Drawing Figures

LOCKABLE CASTOR, IN PARTICULAR SWIVEL CASTOR

This invention relates to a castor, particularly but not exclusively a swivel castor, suitable for example for sick-beds. Such castors have a locking device for locking the running wheel so as to prevent it running and/or swivelling, the catch members of the said locking mechanism being accommodated in the hollow of the castor fork.

Mobile appliances and furniture or the like, particularly mobile hospital or medical furniture and above all sick-beds, are equipped with such castors and in particular such swivel castors, in order that when desired the said appliances and furniture can be immobilised. In order to save the time-consuming and laborious business of locking each individual stationary castor or swivel castor, it is known to provide the sick-beds or other articles of furniture or appliances, or the like, with a central locking mechanism by means of which several, or all the castors, can be simultaneously locked so as to prevent running mobility and/or swivelling mobility of the running wheel.

The central actuation of the locking devices of the castors has hitherto been effected as a rule by hand via lever rods and eccentrics, which however are complicated and necessitate very accurate production and adjustment if the various locking devices of the castors are to be simultaneously locked or unlocked with the necessary accuracy. There has been a tendency therefore to go over to providing the central actuation of the locking devices of the various castors by means of Bowden cables or other cable controls, which however likewise necessitate accurate adjustment, and are difficult to store or fit in or on the appliance or article of furniture, particularly because of the necessarily large radii of curvature required in the cables. It has therefore already been proposed to effect the central actuation of the locking devices of the castors by means of a pressure-transmitting medium, such as air, for instance. However, both pneumatic and hydraulic actuation necessitate very accurately machined and hence expensive components, such as pressure pistons and pressure cylinders of absolute fluidtightness, but which in the course of time become no longer fluidtight and require continual inspection and also frequent servicing, which is too expensive for simple appliances such as sick-beds and furniture or the like.

An object of the invention is to avoid the disadvantages connected with known central fixing devices and to provide a lockable castor which in particular is easy to fit, does not necessitate accurate adjustment, is always reliable in operation, does not require any servicing or maintenance, and whose central actuating device is simple to apply to the sick-bed or other article of furniture or appliance, and can also be accommodated invisibly therein if so desired, without any special constructional requirements having to be taken into consideration.

The invention makes use of the circumstance that most mobile hospital or medical furniture, and also many other appliances, articles of furniture and so on, which are fitted with lockable castors, require electrical energy for various purposes, or even only for lighting, and are therefore provided with an electrical mains plug or have their own source of electrical energy which they carry round with them, such as an electric battery. This particularly applies also to modern sick-beds, which can be electromechanically adjusted as regards their slope and height, or their head or foot parts can be so adjusted, by the patient or by the attendants, for which reason modern sick-beds either have an electric connecting cable with a plug for the connection to the electric mains or, instead, they have their own battery as the source of electrical energy.

The invention additionally utilizes in an extremely simple manner this source of energy already present in modern sick-beds and other appliances and articles of furniture or the like, for locking in position sick-beds or furniture or other articles, that is to say by providing the lockable castors, particularly swivel castors, with a device for electrically setting their locking mechanism for the purpose of locking the running wheel to prevent it running and/or swivelling, or for unlocking it.

According to the invention, the castor, which in particular is a swivel castor, and which is preferably usable for sick-beds, and has a locking mechanism for locking the running wheel so as to prevent it running and/or swivelling, the catch members of which locking mechanism are accommodated in the hollow of the castor fork, is characterized in that the locking mechanism has an electromagnet with a movable magnetic core which is force-lockingly connected to the movable catch members of the locking mechanism and can act on these members against the pressure of a spring. In a simple embodiment the electromagnet can be fitted for this purpose substantially on the rear side of the castor fork or can be conjointly accommodated in the hollow of the castor fork, in order to act by means of a movable magnetic core on the movable catch members of the locking mechanism. This is not only possible in the case of stationary castors, but also in the case of swivel castors, as the modern insulation technique makes it easily possible to feed electrical energy to the electromagnet via slip rings and sliding contacts in an operationally reliable manner.

Even more advantageous is a modification of the invention which is characterized in that the castor has an electric lifting magnet accommodated in the castor fixing pin, the vertically displaceable magnetic core of which magnet can act via an axially-movable actuating pin passing through the castor fixing pin on the movable catch members accommodated in the fork hollow, against the pressure of a spring. As the castor fixing pin does not conjointly rotate even in the case of a swivel castor, with this modification of the invention no slip rings and sliding contacts are necessary for the transmission of the electrical energy — in fact by contrast all that is necessary is simply to connect the electrical connecting wires of the electrical lifting magnet accommodated in the castor fixing pin with the electric cable of the electrical central control system.

Another modification of the invention which has been found particularly advantageous, is characterized in that the castor has an electrical lifting magnet applied on the castor fixing pin, forming a single unit with the said pin and acting as an extension of it, and whose vertically movable magnetic core can act, via an axially-movable actuating pin passing through the castor fixing pin, on the movable catch member accommodated in the fork hollow, against the pressure of a spring. Conventional electrical lifting magnets in cylindrical form are commercially available, which can be used with advantage for extending the castor fixing pin. For this purpose the lifting magnet can have a projection at its front end face, facilitating a simple application on the castor fixing pin. If the electrical lifting magnet is provided with a threaded projection, the connection with the castor fixing pin can be effected simply by screwing into a head-side tapped bore of the castor fixing pin.

In another modification of the invention which has proved to be very advantageous, there can be provided in the castor fixing pin between the actuating pin and the lifting magnet a locking member which can be indexed stepwise to the next position by the lifting magnet, and which locks the fixing pin, which is moved against spring pressure, in its end position. Here the lifting magnet need only operate for short periods, so that its consumption of energy is kept as small as possible.

An advantageous form of embodiment of this modification of the invention is characterized in that the magnetic core and the actuating pin are each movable push pins and the locking member arranged between the two is a ball point pen press alternating shift mechanism, that is an alternating controller press mechanism as used in ball point pens, operating with a toothed rotary disc, in accordance with German Gebrauchsmuster No. 1,960,139 and U.S. Pat. No. 3,571,842 (U.S. Patent Application Ser. No. 695,942) for which the application was filed on the Jan. 5, 1968.

Another advantageous form of embodiment of this modification of the invention is characterized in that the magnetic core and actuating pin are in each case movable push pins and the locking member arranged between the two is a ball point pen press alternating shift mechanism operating with a toothed shift sleeve, in accordance with German Gebrauchsmuster No. 1,960,139 and U.S. Pat. No. 3,571,842 (U.S. Patent Application Ser. No. 695,942) for which the application was filed on the Jan. 5, 1968.

In both forms of embodiment the electrical lifting magnet can have a threaded projection and the castor fixing pin can have on its head side a tapped bore with female thread, in which the locking member is inserted and is held therein by means of the screwed-on electrical lifting magnet.

The axially movable actuating pin can be secured against rotation or twisting and can be enclosed by a helical spring and have at its lower end an outwardly toothed disc, which when the lifting magnet is actuated for the purpose of locking the castor so that it cannot swivel, can catch-engage in a toothed segment or the like of the castor fork.

Further, or instead, the axially movable actuating pin can be enclosed by a pressure spring and can have at its lower end a locking slider guided in the hollow of the castor fork, which when the lifting magnet is actuated can engage in ratchet teeth of the running wheel in order to lock the wheel so as to prevent it from running.

A specific embodiment of the invention as applied to swivel castors will now be described by way of example with reference to the accompanying drawings, in which.

Figure 1:
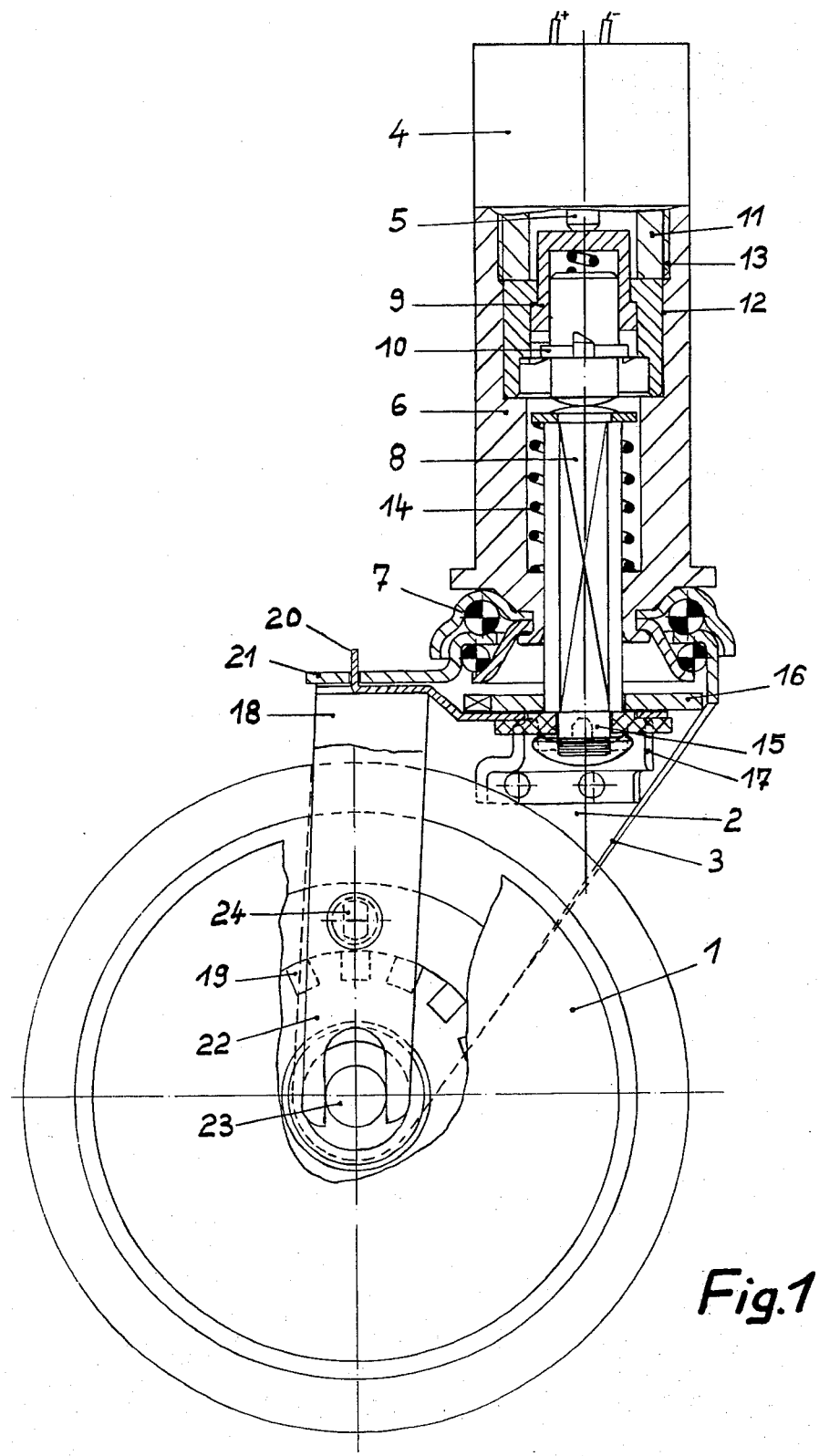
FIG. 1 shows the swivel castor in section in the unlocked and freely movable condition.

The castor represented is a swivel castor which is particularly suitable for use on sick-beds. It has a locking device for locking a running wheel 1 against both running and swivelling movement. The catch members of the locking mechanism are accommodated in a hollow 2 of a castor fork 3. The locking mechanism has an electromagnet 4 with a movable magnetic core 5 which is force-lockingly connected to the movable catch members of the locking mechanism and can act on them against spring pressure.

The electromagnet 4 is applied on the castor fixing pin 6, forms one unit with it and extends the said fixing pin 6. Instead of this arrangement however the electromagnet 4 could also be accommodated in the castor fixing pin 6. The magnet core 5 is vertically displaceable and can act via an axially movable actuating pin 8 passing through a back-set bearing 7 of the castor, on the movable catch members accommodated in the fork hollow 2, against spring pressure.

A locking member 9 is provided inside the castor fixing pin 6, between the actuating pin 8 and the magnet 4, which locking member can be indexed to the next position stepwise by the magnet 4 and which locks the actuating pin 8 moved against spring pressure, in its end position. Here the magnetic core 5 and the actuating pin 8 are each movable push-pins. The locking member 9 arranged between the magnetic core 5 and the actuating pin 8 is, in the embodiment represented, a ball point pen press alternating shift mechanism, that is an alternating controller press mechanism as used in ball point pens, acting with a toothed rotary disc 10 in accordance with German Gebrauchsmuster No. 1,960,139 and U.S. Pat. No. 3,571,842 (U.S. Patent Application Ser. No. 695,942) for which the application was filed on the Jan. 5, 1968. The locking member 9 provided between the magnetic core 5 and the actuating pin 8 could however instead of this also be a ball point pen press alternating shift mechanism acting with a toothed shift sleeve in accordance with German Gebrauchsmuster No. 1,960,139 and U.S. Pat. No. 3,571,842 (U.S. Patent Ser. No. 695,942) for which the application was filed on the Jan. 5, 1968.

In this embodiment the electromagnet 4 has a threaded projection 11 and the castor fixing pin 6 has on the head side a bore 12 tapped with a corresponding female thread 13. The locking member 9 is inserted in the said bore 12 of the castor fixing pin 6, and is held by means of the screwed-on electromagnet 4 in the bore 12 of the castor fixing pin 6.

The axially movable actuating pin 8 is flattened-off and thus secured against twisting. It is enclosed by an helical spring 14 which in the embodiment represented is a compression spring. The axially movable actuating pin 8 has at its lower end 15 an outwardly-toothed disc 16, which can catch-engage in a toothed ratchet segment 17 of the castor fork 3 when the magnet 4 is actuated for the purpose of locking the castor so as to prevent it swivelling. The axially movable actuating pin 8 further has at its lower end 15 a locking slider 18 guided in the fork hollow 2, and which can catch-engage in teeth 19 on the running wheel 1 when the lifting magnet 4 is actuated for the purpose of locking the wheel so as to prevent it running.

Figure 2:
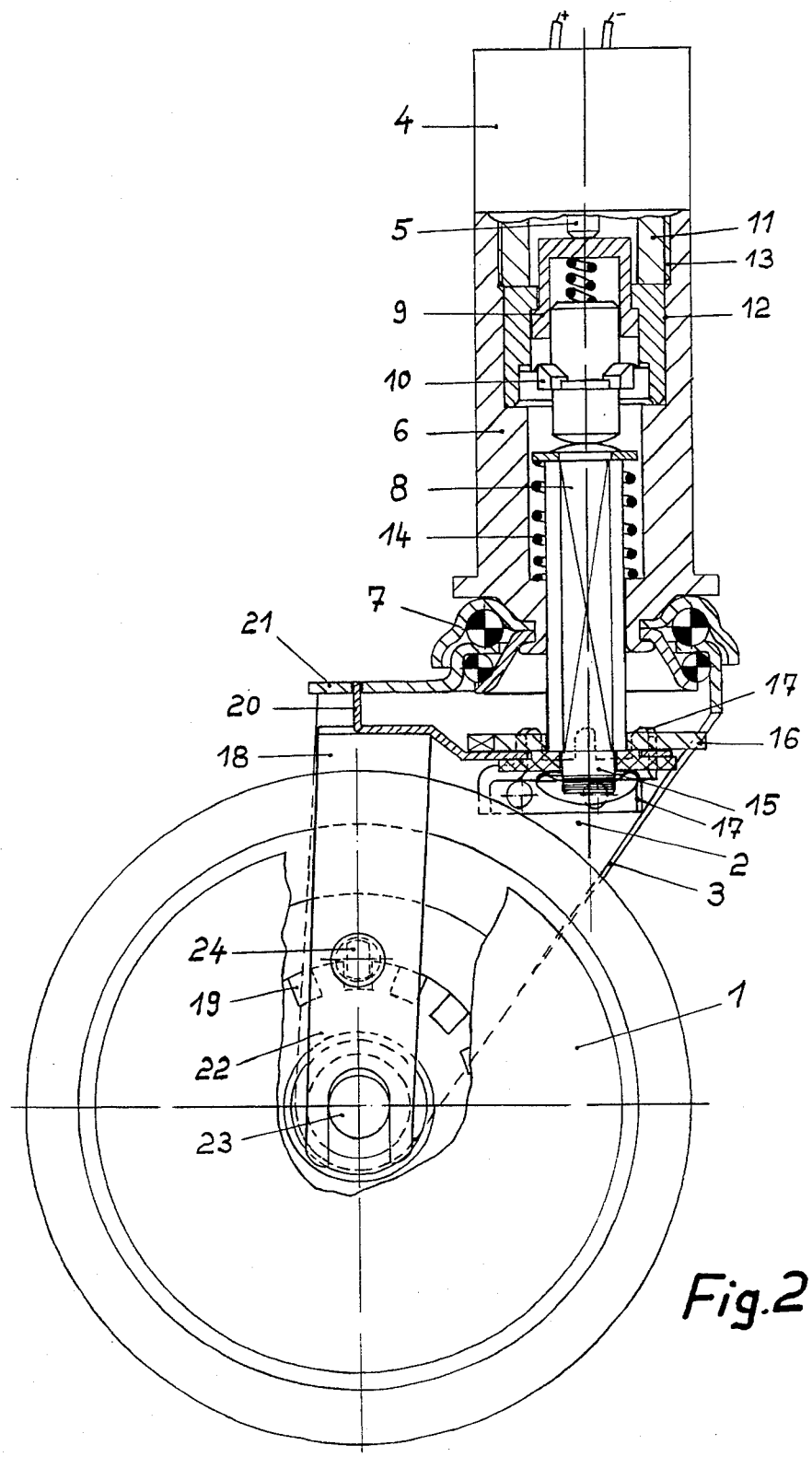
FIG. 2 shows the swivel castor of FIG. 1 in section, in the completely locked condition.
Figure 3:
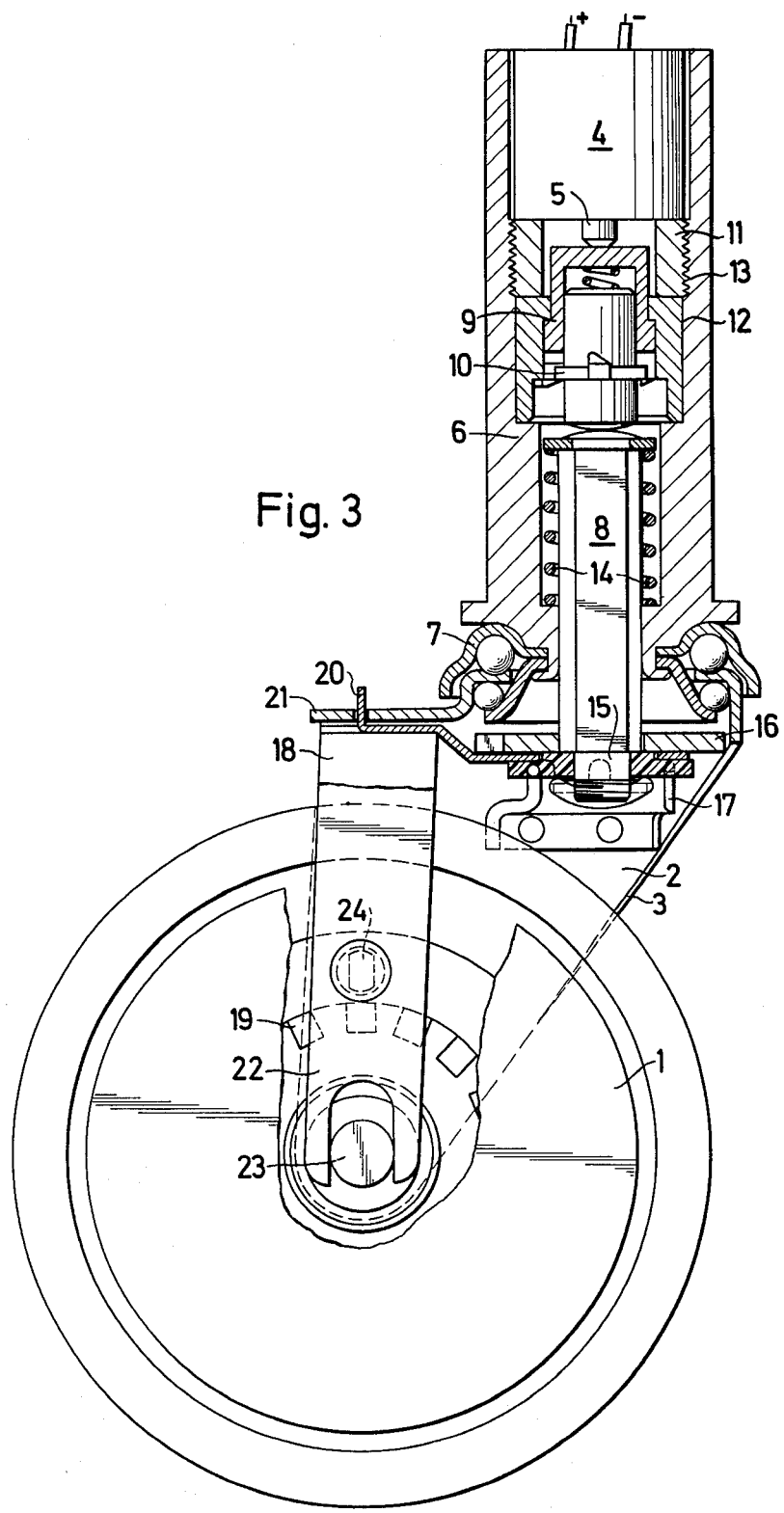
FIG. 3 shows an embodiment wherein the electromagnet is united with a part of the castor fixing pin, the electromagnet being accommodated in the castor fixing pin.

In the unlocked condition (FIG. 1) both the running wheel 1 is movable in that it can run and also the wheel fork 3 is movable in that it can swivel round the castor fixing pin 6. If the electromagnet 4 is now fed with electric current via the electric cable of the central locking mechanism, then its vertically movable magnetic core 5 is thereby pressed downwards. The force exerted by the magnet 4 is transmitted via the interposed locking member 9 to the actuating pin 8 guided in such a way as to be secured against twisting, which is thereby pressed downwards against the pressure of the spring 14 (FIG. 2). The externally-toothed disc 16 located at the lower end 15 of the actuating push pin 8 engages, in the lowest position of the pin 8, in the toothed segment 17 which is fixedly riveted in the hollow 2 of the fork 3, and thus locks the wheel fork 3, and hence the running wheel 1, in such a way as to prevent them swivelling. Simultaneously the locking slider 18, which is guided both by means of a lug 20 in the back portion 21, of the wheel fork 3 and also at its lower end 22 on the wheel axle 23, becomes freed and drops downwards by its own weight. Through this a cam 24 provided at the locking slider 18 comes into engagement in the teeth 19 of the wheel disc of the running wheel 1 and thereby locks the said running wheel 1 so as to prevent it running. The swivel castor is then completely locked so that the running wheel 1 can neither run nor swivel. As the locking member 9 which can be indexed to the next position stepwise blocks upwardly the actuating pin 8 displaced against the pressure of the spring 14 at a return spring, and locks it in its lower end position, the swivel castor also further remains completely locked when the magnet 4 is again de-energized after the current pulse.

If then the electromagnet 4 is again energized via the cable of the central locking mechanism, then the vertically-displaceable magnetic core 5 again acts on the locking member 9, whose toothed rotary disc 10 is again thereby moved on one stage. By this the locking member 9 is unlocked and thus yields to the counter-pressure of the helical spring 14, which accordingly presses the actuating pin 8 back again into its upper end position (FIG. 1). When this upward movement takes place the actuating pin 8 entrains its lower toothed disc 16 upwards so that this latter leaves the toothed segment 17 of the wheel fork 3. Simultaneously during this upward movement the locking slider 18 is also conjointly lifted and its cam 24 leaves the teeth 19 of the running wheel 1. This means that the locking both of the wheel fork 3 preventing it from swivelling and also of the running wheel 1 preventing it from running. is again terminated, so that the swivel castor is now unlocked again and is freely movable.

What we claim is:

1. A castor comprising a fixing pin, a castor fork mounted on the fixing pin, a wheel mounted in the hollow of the castor fork, a locking mechanism including movable catch members for arresting a movement of the wheel, the catch members being accommodated in the hollow of the castor fork, an electromagnet with a movable magnetic core and which is force-lockingly connected to the catch members, a movable actuating pin connecting the movable magnet core and the catch members, said electromagnet being united with and a part of said fixing pin, and a spring operatively interposed between the electromagnet and the catch members so that the electromagnet can act on the catch members against the pressure of the spring.

2. A castor according to claim 1, wherein the electromagnet is at least partially accommodated in said fixing pin, the movable magnet core is vertically displacable, and said actuating pin passes through said fixing pin.

3. A castor according to claim 2, wherein there is provided in said castor fixing pin between said actuating pin and said magnet, a locking member which can be moved stepwise by said magnet, and which locks the actuating pin, displaced against spring pressure, in its end position.

4. A castor according to claim 3, wherein said magnet core and said actuating pin are each movable push pins and said locking member arranged between the two is a ball point pen press alternating shift mechanism.

5. A castor according to claim 3, wherein said electromagnet has a threaded projection and said castor fixing pin has on the head side a bore tapped with a female thread, said threaded projection being screwed into the female thread, said locking member being inserted in the fixing pin and held therein by means of the screwed-on electromagnet.

6. A castor according to claim 1, wherein said electromagnet is mounted on said castor fixing pin and forms an extension thereof, the movable magnetic core being vertically movable and said actuating pin being axially movable, the movable magnet core acting via the axially-movable actuating pin, which passes through said castor fixing pin, on said movable catch members accommodated in the fork hollow, against the pressure of said spring.

7. A castor according to claim 6, wherein there is provided in said castor fixing pin between said actuating pin and said magnet a locking member which can be moved stepwise by said magnet, and which locks the actuating pin, displaced against spring pressure, in its end position.

8. A castor according to claim 7, wherein said magnet core and said actuating pin are each movable push pins and said locking member arranged between the two is a ball point pen press alternating shift mechanism.

9. A castor according to claim 7, wherein said electromagnet has a threaded projection and said castor fixing pin has on the head side a bore tapped with a female thread, said threaded projection being screwed into the female thread, said locking member being inserted in the fixing pin and held therein by means of the screwed-on electromagnet.

10. A castor according to claim 1, wherein said movable actuating pin is secured against twisting or rotation, and said spring is a helical spring surrounding the actuating spring, said actuating pin having at its lower end an exteriorly-toothed disc, a toothed ratchet segment mounted on the castor fork, said toothed disc being adapted to catch-engage in said toothed ratchet segment of the castor fork when the magnet is actuated for the purpose of locking the castor so as to prevent it from swivelling.

11. A castor according to claim 1, wherein said spring is a compression spring surrounding the actuating pin, said actuating pin having at its lower end a locking slider guided in the fork hollow, the wheel having teeth for locking of the castor to prevent running of the wheel, said locking slider being adapted to catch-engage in said teeth of the castor wheel when the electromagnet is actuated for the purpose of locking the wheel so as to prevent it from running.

* * * * *

UNITED STATES PATENT OFFICE
CERTIFICATE OF CORRECTION

PATENT NO. : 3,890,668
DATED : June 24, 1975
INVENTOR(S) : Herbert Stosberg, Horst Fleischmann, Günter Reinhards, and Siegfried Engels It is certified that error appears in the above-identified patent and that said Letters Patent are hereby corrected as shown below:

Page 1, [73], change "Tente-Rollen G.m.b.H." to --Tente-Rollen G.m.b.H. & Co.--

Signed and Sealed this fifteenth Day of June 1976

[SEAL]

Attest:

RUTH C. MASON
Attesting Officer

C. MARSHALL DANN
Commissioner of Patents and Trademarks